United States Patent [19]

Baldwin

[11] 3,887,702

[45] June 3, 1975

[54] COMPOSITION AND METHOD FOR TREATING FINGERNAILS AND TOENAILS

[76] Inventor: Mildred Baldwin, 1545 Archer Rd., Bronx, N.Y. 10462

[22] Filed: Aug. 30, 1973

[21] Appl. No.: 392,970

[52] U.S. Cl. .................................. 424/61; 424/284
[51] Int. Cl. .............................................. A61k 7/04
[58] Field of Search .............................. 424/61, 284

[56] References Cited
UNITED STATES PATENTS

| | | | |
|---|---|---|---|
| 2,366,260 | 1/1945 | Hickey | 424/61 X |
| 2,449,070 | 9/1948 | Hauser et al. | 424/61 |

OTHER PUBLICATIONS

Thomssen Modern Cosmetics, 1947, 3rd edition pp. 435 to 437.
Sagarin Cosmetics Sci. & Technology, 1957, pp. 709 to 711.
Wells et al. Cosmetics & The Skin, 1964, pp. 291 to 293, 118 and 119.
Winter Handbuch Der Gesamten Parfumeric Und Kosmetic 1952, p. 649.

*Primary Examiner*—Albert T. Meyers
*Assistant Examiner*—Dale R. Ore
*Attorney, Agent, or Firm*—Amster & Rothstein

[57] ABSTRACT

Treating fingernails and toenails to prevent or mitigate brittleness with attendant splitting and breaking and to promote growth and generally enhance the quality of the nail by the topical application of a liquid comprising soybean oil, sunflower oil and vitamin E.

6 Claims, No Drawings

COMPOSITION AND METHOD FOR TREATING FINGERNAILS AND TOENAILS

This invention relates to an improved method of treating nails, particularly human fingernails and toenails, and to improved compositions which are useful for such treatment. Long fingernails, while widely considered fashionable, are frequently difficult to grow and are subject to brittleness, breaking, cracking or splitting. Some fingernail base compositions, nail polish removers, and the like, used in manicuring, cause fingernails and toenails to become dry and brittle, and susceptible to splitting and breaking, thereby detracting from the appearance of the user, as well as being painful.

It has been suggested to overcome these problems by the use of a hardening agent. Many of the hardening agents have required that nails be soaked in chemical solutions for extended periods, then washed and dried. Other hardening agents are capable of performing the function in a more rapid manner. It has now been discovered that the general quality of the nails can be improved by the topical application of a liquid comprising soybean oil, sunflower oil and vitamin E. This composition promotes the growth of the nail, reduces the amount of splitting and peeling and generally enhances the quality and appearance of fingernails and toenails. It also eliminates chalkiness and will restore a healthy pink color to discolored nails.

The compositions of this invention comprise soybean oil or sunflower oil containing from 200 to 2800 international units of vitamin E per fluid ounce of oil. The compositions comprise from 1 to 19 parts, preferably 10 to 15 parts, of soybean oil, from 19 to 1 parts, preferably 15 to 10 parts, of sunflower oil and from 200 to 2800 international units, preferably from 1000 to 1500 units, of vitamin E per ounce of oil. The most preferred composition of this invention contains from 13 to 15 parts of soybean oil and from 7 to 5 parts of sunflower oil and approximately 1300 to 1500 international units of vitamin E per fluid ounce of oil. These compositions can be easily made with commercially available ingredients by simply mixing.

The sunflower oil is a vegetable oil which is suitable for use in salad dressing and commonly sold for that purpose. Preferably, the oil is 100% vegetable oil rich in unsaturates and containing no preservatives. Likewise, the soybean oil which is useful in the compositions of this invention includes those oils commonly sold for food applications. "Vitamin E" are used herein means those products which are commonly sold and labelled vitamin E which includes $\alpha$ tocopherol, $\alpha$ tocopherol being the tocopherol having the highest vitamin E biological activity. Thus, for maximum potency, $\alpha$ tocopherol or its acyl esters are employed in the preparation of the present compositions. However, minor proportionate amounts of non-$\alpha$ tocopherol materials such as $\gamma$ tocopherol, $\delta$ tocopherol and $\beta$-tocopherol or their acyl esters, preferably alkyl esters, in admixture with $\alpha$ tocopherol or its acyl esters, can also be utilized and are included with the term "vitamin E". The commercially available vitamin oils are preferred. However, the dry product can be blended with the oils.

These compositions are beneficially applied topically to the fingernails and toenails even without subsequent applications of nail polish. It is envisioned, however, that the compositions will be used by the manicurist or at home as part of the treatment for applying polish to the nails. In this regard, the composition should be applied with a brush or other suitable implement after the nails have been cleaned and dried and prior to the application of a base coat of polish. Initially, the compositions should be applied at least 3 times per week until the appearance improves. Usually, the frequency of application can be reduced to 1 or 2 times per week after three or four weeks. After the nails have been restored, the compositions should be applied at least once per week. It is not necessary to wait until the composition is dry before applying the base coat; however, one should remove the excess prior to the application of the base coat. The compositions can also be applied by soaking the fingernails in the compositions. This, however, is not necessary. If soaking is selected as the form of application, however, the soaking can be beneficially maintained for from 1 to 5 minutes at room temperature.

The following examples illustrate the instant invention.

The following compositions are prepared by blending vitamin E with the two oils.

| Composition No. | Soybean Oil Fluid Ounces | Sunflower Oil Fluid Ounces | Vitamin E International Units |
| --- | --- | --- | --- |
| 1 | 2 | 18 | 4,000 |
| 2 | 2 | 18 | 10,000 |
| 3 | 2 | 18 | 28,000 |
| 4 | 2 | 18 | 56,000 |
| 5 | 6 | 14 | 4,000 |
| 6 | 6 | 14 | 10,000 |
| 7 | 6 | 14 | 28,000 |
| 8 | 6 | 14 | 56,000 |
| 9 | 10 | 10 | 4,000 |
| 10 | 10 | 10 | 10,000 |
| 11 | 10 | 10 | 28,000 |
| 12 | 10 | 10 | 56,000 |
| 13 | 14 | 6 | 4,000 |
| 14 | 14 | 6 | 10,000 |
| 15 | 14 | 6 | 28,000 |
| 16 | 14 | 6 | 56,000 |
| 17 | 18 | 2 | 4,000 |
| 18 | 18 | 2 | 10,000 |
| 19 | 18 | 2 | 28,000 |
| 20 | 18 | 2 | 56,000 |
| 21 | 13 | 7 | 4,000 |
| 22 | 13 | 7 | 10,000 |
| 23 | 13 | 7 | 28,000 |
| 24 | 13 | 7 | 56,000 |
| 25 | 0 | 20 | 4,000 |
| 26 | 0 | 20 | 10,000 |
| 27 | 0 | 20 | 28,000 |
| 28 | 0 | 20 | 56,000 |
| 29 | 20 | 0 | 4,000 |
| 30 | 20 | 0 | 10,000 |
| 31 | 20 | 0 | 28,000 |
| 32 | 20 | 0 | 56,000 |

EXAMPLE I

Compositions 1–24 are prepared by thoroughly blending the ingredients and then used for the topical application to fingernails and toenails as follows. After cleaning and otherwise preparing the nail, the liquid composition is brushed onto the nail, the excess is removed, and a clear base coat of polish is applied to the nail. As soon as the base coat dries, nail polish can be applied. This treatment is repeated three times per week. Brittle and unsightly nails respond quickly and within a few weeks the nails lose brittleness and have a healthy appearance. The best results are achieved with compositions 13–16. The most preferred is composition number 15.

EXAMPLE II

Compositions 25–32 are prepared by thoroughly blending the ingredients. These compositions are applied as described in Example I. The appearance and health of the nails improve, but to a much lesser degree than with the treatment with the compositions of Example I.

The invention has been described with particularity. Certain ingredients can be added without departing from the scope and spirit of this invention.

What is claimed is:

1. A composition for improving the quality of fingernails and toenails consisting essentially of an effective amount of an oil chosen from the group consisting of soybean oil, sunflower oil, and combinations thereof comprising from 1 to 19 parts soybean oil and from 19 to 1 parts sunflower oil, and from 200 to 2800 international units of vitamin E per fluid ounce of oil.

2. A composition according to claim 1 wherein the oil is sunflower oil.

3. A composition according to claim 1 wherein the oil is soybean oil.

4. A composition for improving the quality of fingernails and toenails comprising from 1 to 19 parts soybean oil, from 19 to 1 parts sunflower oil, and from 200 to 2800 international units of vitamin E per fluid ounce of oil.

5. A composition for improving the quality of fingernails and toenails consisting essentially of from 7 to 5 parts of sunflower oil and from 13 to 15 parts of soybean oil and from 1300 to 1500 units of vitamin E per fluid ounce of oil.

6. A method for improving the quality of fingernails and toenails comprising applying topically to the nails an effective amount of the composition of claim 1.

* * * * *